(12) United States Patent
Weatherall

(10) Patent No.: US 12,304,126 B2
(45) Date of Patent: May 20, 2025

(54) METHOD OF IMPROVING SHOT REPEATABILITY IN MULTILAYER RECIPROCATING SCREW INJECTION MOLDING MACHINES

(71) Applicant: HUSKY INJECTION MOLDING SYSTEMS LTD., Bolton (CA)

(72) Inventor: Douglas James Weatherall, Bolton (CA)

(73) Assignee: Husky Injection Molding Systems Ltd., Bolton (CA)

( * ) Notice: Subject to any disclaimer, the term of this patent is extended or adjusted under 35 U.S.C. 154(b) by 77 days.

(21) Appl. No.: 18/004,914

(22) PCT Filed: Jul. 13, 2021

(86) PCT No.: PCT/CA2021/050967
§ 371 (c)(1),
(2) Date: Jan. 10, 2023

(87) PCT Pub. No.: WO2022/020938
PCT Pub. Date: Feb. 3, 2022

(65) Prior Publication Data
US 2023/0234270 A1    Jul. 27, 2023

Related U.S. Application Data

(60) Provisional application No. 63/058,073, filed on Jul. 29, 2020.

(51) Int. Cl.
*B29C 45/76* (2006.01)
*B29C 45/16* (2006.01)

(52) U.S. Cl.
CPC ........ *B29C 45/762* (2013.01); *B29C 45/1607* (2013.01); *B29C 45/1642* (2013.01); *B29C 45/1646* (2013.01)

(58) Field of Classification Search
CPC ............ B29C 45/1607; B29C 45/1642; B29C 45/1646; B29C 45/762; B29C 45/1603; B29C 45/164; B29C 45/77
See application file for complete search history.

(56) References Cited

U.S. PATENT DOCUMENTS

| | | | |
|---|---|---|---|
| 4,808,101 A | 2/1989 | Schad et al. | |
| 4,990,301 A | 2/1991 | Krishnakumar et al. | |
| (Continued) | | | |

FOREIGN PATENT DOCUMENTS

| | | |
|---|---|---|
| DE | 23 55 458 A1 | 5/1975 |
| DE | 199 48 278 A1 | 4/2001 |
| WO | WO 2007/012317 A2 | 2/2007 |

OTHER PUBLICATIONS

FANUC Ltd, Roboshot S-2000i, Dec. 2005, 11, Oshino-mura, Yamanashi Japan.
(Continued)

*Primary Examiner* — Yunju Kim
(74) *Attorney, Agent, or Firm* — Wolf, Greenfield & Sacks, P.C.

(57) ABSTRACT

In one aspect there is disclosed a method of improving shot repeatability in a multilayer reciprocating screw injection molding apparatus by preventing pressure communication or "cross-talk" between melt channels. In the first aspect an outlet nozzle valve is closed prior to closing a check valve within an injection unit of the multilayer reciprocating screw injection molding apparatus. In another aspect there is disclosed a method of improving shot repeatability in a reciprocating screw injection molding apparatus by recording a first position of a screw within the barrel of an injection unit of a reciprocating screw injection molding apparatus, the first position corresponding to a volume of melt within the barrel of the material injection unit. A second position of the screw is then calculated based on the first position, the
(Continued)

second position corresponding to a transition position of the screw within the barrel of the injection unit of the reciprocating screw injection molding apparatus.

9 Claims, 8 Drawing Sheets

(56) References Cited

U.S. PATENT DOCUMENTS

| | | | |
|---|---|---|---|
| 5,002,717 A | | 3/1991 | Taniguchi |
| 5,040,963 A | | 8/1991 | Beck et al. |
| 5,258,147 A | | 11/1993 | Yokota |
| 5,266,247 A | | 11/1993 | Yokota |
| 6,371,748 B1 | | 4/2002 | Hara |
| 7,654,809 B2 | | 2/2010 | Takatsugi et al. |
| 2005/0161847 A1 | * | 7/2005 | Weatherall ............. B29C 45/77 |
| | | | 425/145 |
| 2008/0152748 A1 | | 6/2008 | Takatsugi et al. |
| 2020/0406521 A1 | * | 12/2020 | Altonen ................ B29C 45/766 |

OTHER PUBLICATIONS

Extended European Search Report for European Application No. 21849399.7 dated Oct. 10, 2024.

* cited by examiner

METHOD OF IMPROVING SHOT REPEATABILITY IN MULTILAYER RECIPROCATING SCREW INJECTION MOLDING MACHINES

CROSS-REFERENCE TO RELATED APPLICATIONS

This application is a national stage filing under 35 U.S.C. § 371 of International Application No. PCT/CA2021/050967, filed Jul. 13, 2021, which claims priority to U.S. Provisional Application No. 63/058,037.

TECHNICAL FIELD

The present disclosure relates to injection molding of plastic articles, and more particularly to methods for improving shot repeatability in multilayer reciprocating screw injection molding machines.

BACKGROUND

A molding machine may channel a flow of melted molding material, such as melted plastic or resin, through a distribution network, such as a hot runner, for dispensing into a mold through a nozzle. Dispensing of the melted molding material may occur during injection molding for example. Melted molding material may be dispensed from a nozzle in a substantially annular or cylindrical flow. For example, an annular or cylindrical flow may be dispensed or injected into a mold cavity during injection molding of an article having a generally tubular shape, such as a preform suitable for subsequent blow-molding to form a container such as a plastic beverage bottle for example. The flow may be, or may become, annular as it enters the gate of the mold cavity and may spread to surround a core insert component of the mold cavity.

Molding machines suitable for molding articles, such as, for example, thin wall containers having one or more layer(s) of thermoplastic, broadly include a clamp unit for operating a mold and one or more injection unit(s) for plasticizing and injecting thermoplastic(s) into the mold when closed and clamped. The structure and operation of clamp and injection units vary. Examples of typical injection units include the so-called reciprocating screw (RS) and two-stage varieties.

As the name implies, an RS injection unit generally comprises an elongated screw housed within a cylindrical channel which moves axially back and forth carrying out both plasticizing and injection functions. A hopper (or other such container) located at an upstream end of the cylindrical channel in fluid communication therewith holds solid plastic resin (e.g. high-density polyethylene, polypropylene, polyethylene terephthalate (PET)) granules (e.g. flakes or pellets) for introduction into the cylindrical channel during an injection cycle. Rotational actuation of the screw causes the plastic resin granules to plasticize and travel down the channel to a downstream end thereof to produce a melt. Once a sufficient amount of melt is contained in the front (i.e., downstream) end of the channel, the screw is actuated in a forward direction towards an outlet nozzle to inject the melt through a hot runner, mold gate, and into a mold for forming a molded article. Usually, a check valve or ring coupled to the screw at the downstream end (i.e., proximate to the outlet nozzle) is used to prevent melt from retreating upstream (i.e., away from the outlet nozzle) along the flights of the screw under pressure from the melt being injected into the mold. In some such systems, the upstream pressure from the melt at the start of injection is sufficient to close the check valve or ring.

As the name implies, a two-stage injection unit includes distinct structure and steps separating the functions of plasticizing and injection. The structure of a two-stage injection unit includes a plasticizer and a shooting pot. The plasticizer is functionally and structurally similar to an RS injection unit, described above, except that a transfer step replaces the injection step. In the transfer operation melt accumulated in the plasticizer is transferred, at low pressure and speed, to the shooting pot with selective operation of a distributor valve positioned therebetween. As the name implies, the shooting pot is configured to sequentially accumulate melt, from the plasticizer, and then inject the melt into the mold.

Molding systems for molding articles made from multiple materials, e.g. multilayered articles, usually include multiple injection units i.e. primary and auxiliary (secondary) injection unit(s). The primary and secondary injection units may be any type of injection unit, e.g. RS or two-stage, the selection depending on the molding requirements e.g. volume of melt, cycle time.

Two (or more) channels may be used to mold multilayer articles in a molding machine. A multi-channel coinjection nozzle having multiple channels for simultaneously dispensing multiple respective layers of material may be used to form such multilayer molded articles. For example, a coinjection nozzle may dispense annular inner and outer melt streams of an external layer (or "skin layer") material simultaneously or sequentially with an annular stream of an internal layer (or "core layer") material sandwiched between the inner and outer streams. The external layer material may for example be PET. The internal layer material may for example comprise nylon or a barrier material (e.g. an oxygen scavenger material) suitable for protecting subsequent contents of the molded article from external contamination (e.g. oxidation). Alternatively, the internal layer material may comprise a post-consumer recycled (PCR) material, such as PCR PET, for example, for producing molded articles at a lower cost.

Generally, in multilayer reciprocating screw coinjection machines two or more injection units may be in fluid communication with the same multi-channel coinjection nozzle(s). However, when a first injection unit begins its injection (leading) stroke, pressure from the melted resin being injected to form the external layer may affect the second injection unit (for forming the internal layer) because of fluid communication between the injection units via the multi-channel coinjection nozzle(s) (i.e., "cross-talk" may occur between the injection units). A result of this is that the volume of melt may vary from shot-to-shot, unpredictably causing shorts (i.e., underfilling of the mold) and flashes (i.e., overfilling of the mold), resulting in wasted time and material. Therefore, a need exists to prevent such pressure transmission between injection units in a multilayer reciprocating screw molding machine. In addition, there is a need to more precisely measure a volume of melt that will be injected into a mold prior to injection in a reciprocating screw injection molding machine, also with the aim of improving shot-to-shot repeatability.

SUMMARY

According to a first aspect of the present disclosure, there is provided a method of improving shot repeatability in a coinjection molding machine comprising at least one RS coinjection unit by preventing pressure transmission or crosstalk between injection units.

The reciprocating screw coinjection machine comprises an external layer injection unit and an internal layer injection unit. The internal layer injection unit comprises a screw housed within a barrel, the barrel having an upstream end and a downstream end. The screw further comprises a check ring. The external layer injection unit may comprise a second screw housed within a second barrel, the second barrel having an upstream end and a downstream end. The second screw further may comprise a second check ring. The external layer injection unit and the internal layer injection unit are upstream from and in fluid communication with a mold cavity for receiving a multi-layer melt stream therefrom. At least the internal layer injection unit further comprises an outlet nozzle valve operable to allow fluid communication between the internal layer injection unit and the mold cavity when in an open position, and to prevent fluid communication between the internal layer injection unit and the mold cavity when in a closed position.

The method for improving shot repeatability according to the first aspect of the present disclosure comprises: closing the outlet nozzle valve of the internal layer injection unit; plasticizing and metering a melt material in the downstream end of the barrel via rotational actuation of the screw to produce a melt; ceasing application of the rotational actuation of the screw and allowing the screw to retreat a distance in the upstream direction in the barrel such that a pressure gradient across the check ring is diminished; applying an axial force to the screw in the downstream direction to increase the pressure gradient across the check ring sufficient to close the check ring, thereby preventing pressure transmission between the external layer injection unit and the internal layer injection unit; ceasing application of the axial force to the screw and allowing the screw to retreat a distance in the upstream direction such that the pressure gradient across the check ring is diminished and beginning injection of the first melt into the mold cavity. The method according to the first aspect may also comprise applying an axial force on the screw of the internal layer injection unit to inject the second melt into the mold cavity; ceasing application of the axial force on the second screw; and ceasing injection of the first melt.

According to a second aspect of the present disclosure, there is provided a method of improving shot repeatability in an injection molding machine comprising at least one RS injection unit by preventing pressure transmission or "crosstalk" between injection units, and for further improving shot repeatability in a reciprocating screw injection molding machine by measuring a first screw position prior to an injection stroke in a first injection unit, calculating shot volume based at least in part on the first screw position, and calculating a transition position of the first screw based on the calculated shot volume.

The coinjection machine comprises an external layer injection unit and an internal layer injection unit. The internal layer injection unit comprises a screw housed within a barrel, the barrel having an upstream end and a downstream end. The screw further comprises a check ring. The external layer injection unit may comprise a second screw housed within a second barrel, the second barrel having an upstream end and a downstream end. The second screw may further comprise a second check ring. The external layer injection unit and the internal layer injection unit are upstream from and in fluid communication with a mold cavity for receiving a multi-layer melt stream therefrom. At least the internal layer injection unit further comprises an outlet nozzle valve operable to allow fluid communication between the internal layer injection unit and the mold cavity when in an open position, and to prevent fluid communication between the internal layer injection unit and the mold cavity when in a closed position.

The method for improving shot repeatability according to the second aspect of the present disclosure comprises: closing the outlet nozzle valve of the internal layer injection unit; plasticizing and metering a melt material in the downstream end of the barrel via rotational actuation of the screw to produce a melt; ceasing application of the rotational actuation of the screw and allowing the screw to retreat a distance in the upstream direction in the barrel such that a pressure gradient across the check ring is diminished; applying an axial force to the screw in the downstream direction to increase the pressure gradient across the check ring sufficient to close the checkring, thereby preventing pressure transmission between the external layer injection unit and the internal layer injection unit; ceasing application of the axial force to the screw and allowing the screw to retreat a distance in the upstream direction such that the pressure gradient across the check ring is diminished; measuring a first position of the screw within the first barrel, the first position corresponding to a volume of the melt within the barrel; calculating a second position of the screw within the barrel, the second position corresponding to a transition position of the screw; and applying an axial force on the screw to begin injection of the melt into the mold cavity. The method according to the second aspect may also comprise coinjecting a second melt into the mold cavity According to a third aspect of the present disclosure, there is provided a method of improving shot repeatability in a reciprocating screw injection molding machine.

The reciprocating screw injection molding machine comprises an injection unit. The injection unit comprises a screw housed within a barrel, the barrel having an upstream end and a downstream end. The screw further comprises a check ring. The injection unit is upstream from and in fluid communication with a mold cavity for receiving a melt stream therefrom. The injection unit further comprises an outlet nozzle valve operable to allow fluid communication between the injection unit and the mold cavity when in an open position, and to prevent fluid communication between the injection unit and the mold cavity when in a closed position.

The method for improving shot repeatability according to the third aspect of the present disclosure comprises: closing the outlet nozzle valve of the injection unit; plasticizing and metering a melt material in the downstream end of the barrel via rotational actuation of the screw to produce a melt; ceasing application of the rotational actuation of the screw and allowing the screw to retreat a distance in the upstream direction in the barrel such that a pressure gradient across the check ring is diminished; applying an axial force to the screw in the downstream direction to increase the pressure gradient across the check ring sufficient to close the check ring; ceasing application of the axial force to the screw and allowing the screw to retreat a distance in the upstream direction such that the pressure gradient across the check ring is diminished; measuring a first position of the screw within the barrel, the first position corresponding to a volume of the melt within the barrel; calculating a second position of the screw within the barrel, the second position corresponding to a transition position of the screw; and applying an axial force on the screw to inject the melt material into the mold cavity.

Other features and advantages of the present invention will become apparent from the drawings in conjunction with the following description.

DESCRIPTION OF THE DRAWINGS

The non-limiting embodiments will be more fully appreciated by reference to the accompanying drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF THE NON-LIMITING EMBODIMENT(S)

In this document, any use of the term "exemplary" should be understood to mean "an example of" and not necessarily to mean that the example is preferable or optimal in some way. Terms such as "downwardly," "right," and "left" may be used to describe features of some embodiments in this description but should not be understood to necessarily connote an orientation of the embodiments during manufacture or use. The word "downstream" should be understood in the context of injection molding to refer to the direction from a resin source toward a mold cavity, and the word "upstream" refers to the opposite direction.

Figure 1:
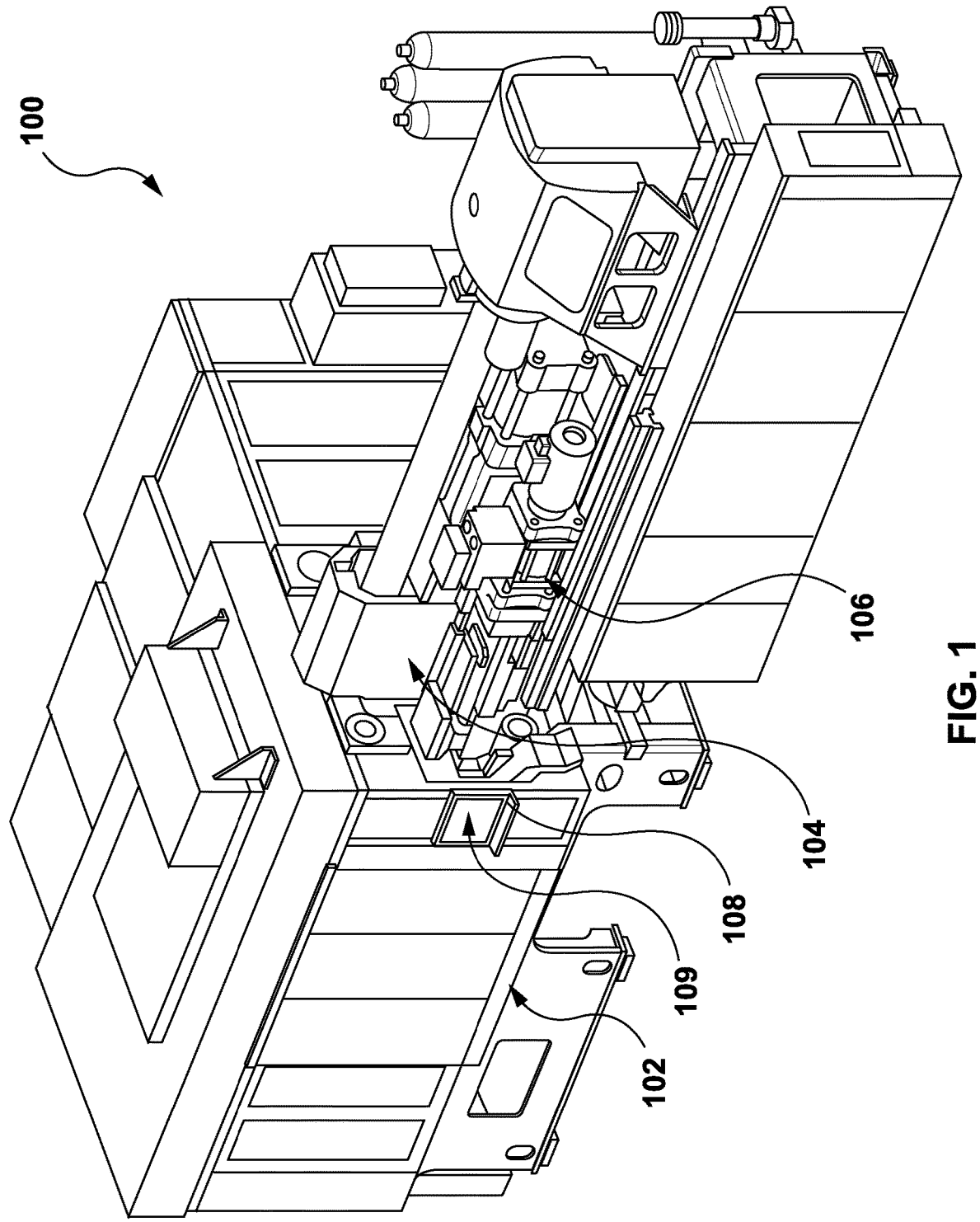
FIG. 1 is a perspective view of an injection molding machine for molding multilayer articles.

FIG. 1 depicts an injection molding machine 100 in perspective view. The exemplary injection molding machine 100 is for molding multilayer articles, such as the example preform 200 of FIG. 2 (described below).

The injection molding machine 100 depicted in FIG. 1 comprises an enclosure 102 housing a clamp unit, a fixed platen, a movable platen, and a mold mounted therebetween, none of which are visible in FIG. 1. The injection molding machine 100 further comprises first and second injection units 104 and 106, which are for plasticizing (melting) and injecting an external (i.e., surface) layer melt material and an internal (i.e., core) layer melt material, respectively (both being forms of molding material), and which may accordingly be referred to herein as the external injection unit 104 and the internal injection unit 106 respectively. The external layer melt material may for example be PET. The internal layer melt material may for example be nylon, a barrier or oxygen-scavenging material, or a post-consumer recycled (PCR) material such as PCR PET. In the present example, the external injection unit 104 is a two-stage injection unit and the internal injection unit 106 is a reciprocating screw injection unit. The external and internal injection units are operable to inject molding material into mold cavities via a hot runner. The internal layer injection unit 106 of the present embodiment is depicted in greater detail in FIG. 1A, described below.

In accordance with a further alternative embodiment, not shown, the external and internal injection units 104, 106 are both reciprocating screw injection units.

The controller 108 of FIG. 1 controls the operation of injection molding machine 100 based on human operator input or based on a preset control sequence, among other functions. In the present embodiment, the controller 108 comprises at least one processor in communication with volatile or non-volatile memory storing computer-readable program code stored on a tangible medium, e.g., ROM, optical disk, USB drive, or magnetic storage medium. In some embodiments, the computer-readable program code may be transmitted to the memory via a modem or communications adapter communicatively coupled to a network, e.g. a wide area network such as the Internet. The controller 108 may for example be an industrial PC, or a Beckhoff® model CP22xx Panel PC with Intel® Core™ i processor. Control instructions may be entered by a human operator via human-machine interface (HMI) 109, which may for example be a multi-function touchscreen that forms part of, or is coupled to, the controller 108. The HMI 109 may display various graphical user interface (GUI) screens used for controlling or monitoring aspects of the molding process.

A hot runner within enclosure 102 defines a network of channels for conveying external layer melt material and internal layer melt material from first and second injection units 104 and 106 respectively to each of a plurality of multi-channel nozzles, described below. Each nozzle is positioned near an associated mold cavity defined in the mold. Each mold cavity is a negative shape (space) in the shape of the article to be molded, which in this example is preform 200 of FIG. 2. The number of mold cavities that can be simultaneously filled by molding machine 100 is typically greater than one and may vary between embodiments.

Figure 1A:
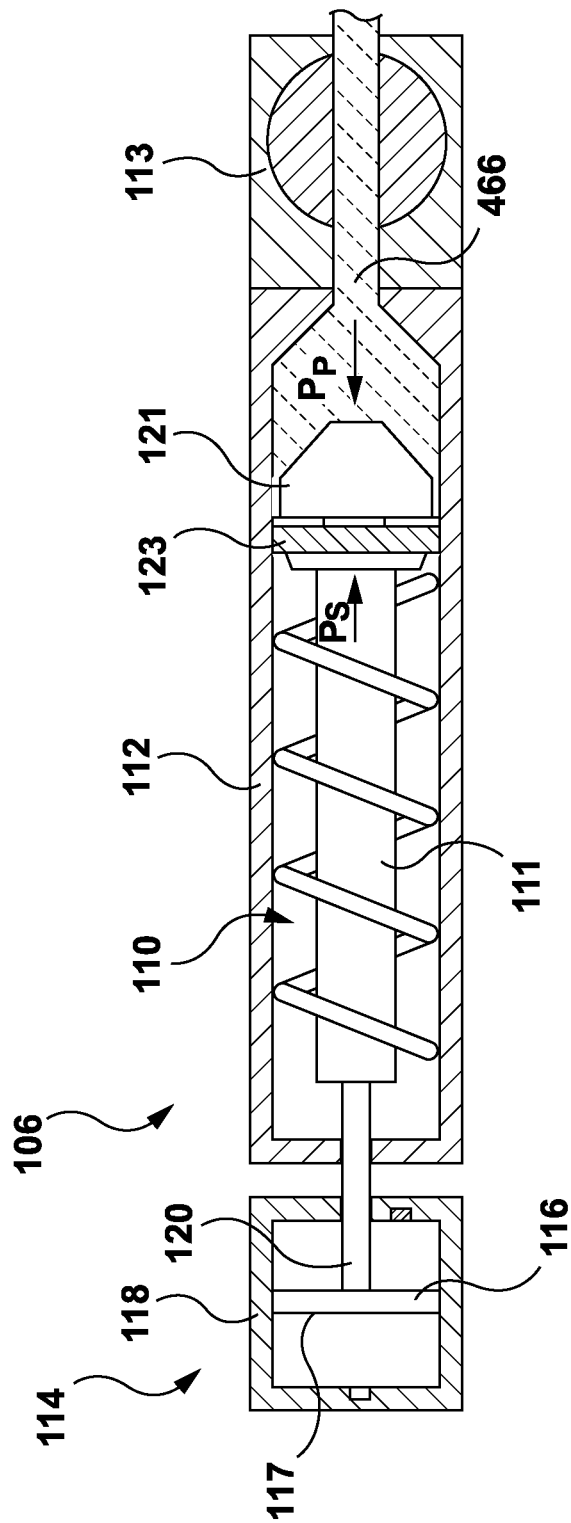
FIG. 1A is a schematic view of an internal layer injection unit component of the injection molding machine of FIG. 1.

FIG. 1A depicts a schematic representation of the second (internal layer melt material) injection unit 106 of FIG. 1 in isolation from the other components of injection molding machine 100. Injection unit 106 comprises a helical reciprocating plasticizing screw 110 housed in an extruder barrel 112. The barrel 112 can be selectively heated and has an inlet (not expressly depicted) for receiving internal layer material, e.g. in pellet form (not expressly depicted). The screw 110 is rotatable within the heated barrel 112 to mix and plasticize (melt) internal layer material into a melt 466. The screw 110 comprises a tip 121 including a check ring 123, although other check valve arrangements are possible. The check ring 123 allows plasticized melt material to flow past it in a downstream direction (i.e., toward the right in FIG. 1A) while preventing flow in the upstream (i.e., opposite) direction. The check ring 123 closes when the pressure Pp exceeds Ps which occurs when the screw moves forward to inject the plastic (as shown in 1A). An outlet nozzle valve 113 can be selectively opened or closed by controller 108 (FIG. 1A) to selectively establish fluid communication between the second (external layer melt material) injection unit 106 and the downstream hot runner. In FIG. 1A, the outlet nozzle valve 113 is in the open position.

The second injection unit 106 of FIG. 1A also comprises, or is otherwise associated with, an injection actuator 114. The injection actuator 114 (or simply "actuator 114") is configured to reciprocate the screw 110 longitudinally within the barrel 112 to effect injection and recovery phases of operation of internal layer material injection unit 106. In the present embodiment, the actuator 114 comprises a piston 116 housed in a hydraulic cylinder 118, however noting that the actuator 114 may be implemented differently e.g. ball screw actuator. The piston 116 is attached to a rod 120 that drives screw 110. The rod 120 may be an extension of a central shaft 111 of screw 110. Typically a second actuator (not shown) may impart rotational movement to the screw 110.

Figure 1B:
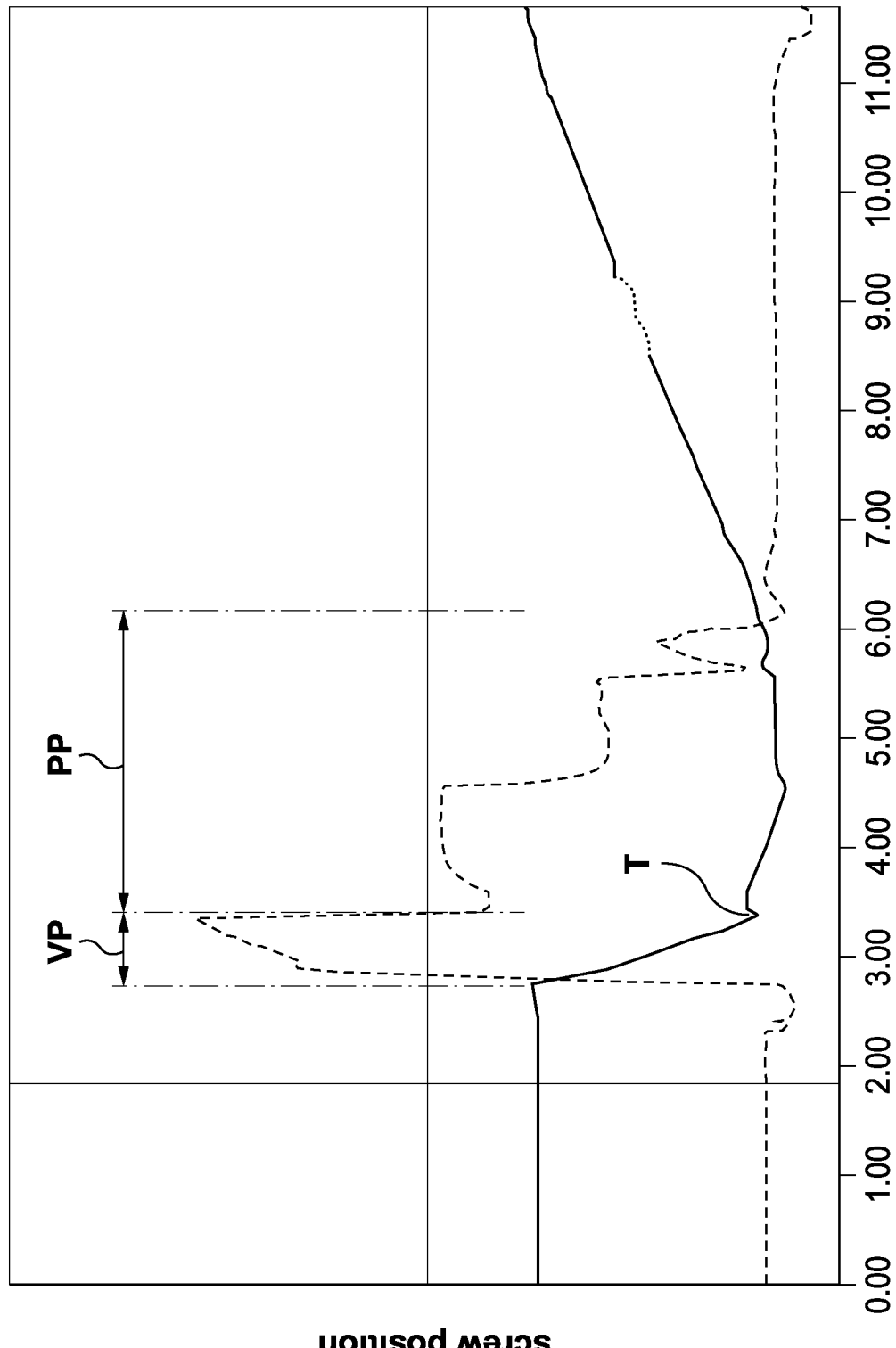
FIG. 1B is a plot of injection pressure and screw position versus time in the internal layer injection unit component of the injection molding machine of FIG. 1 during an injection stroke.

The depicted actuator 114 is controlled by controller 108. During injection, the controller 108 may be programmed to follow a series of instructions to impart two types of linear actuation to the screw 110. This is shown graphically in FIG. 1B, which depicts a velocity/pressure versus time profile for an injection unit. In FIG. 1B, the x-axis represents duration, and the y-axis represents screw 121 position (with respect to the downstream end of the barrel, i.e., the right end in FIG. 1A), and plastic pressure Pp of melt 466. Initially, the controller 108 follows a velocity profile VP, in which the controller 108 causes the screw 110 to move in the forward direction (i.e., to the right in FIG. 1A) at a particular velocity (which may or may not be constant) until the mold cavity (not shown) is nearly completely filled with melt 466. The velocity profile VP is shown graphically in FIG. 1B between the left-most and center vertical lines. At point T, the controller 108 may switch to pressure control and subsequently follow a pressure profile PP, in which the controller 108 causes the screw 110 to apply a pressure (which may change over time) on the melt 466 as the melt 466 cools and solidifies within the mold. The pressure profile PP is shown graphically in FIG. 1B between the center and right-most vertical lines. At the point in time when the controller 108 switches from a velocity profile VP to a pressure profile PP, screw 110 will be at a point within the barrel 112 that may be called transition position T, indicated as point T in FIG. 1B.

Figure 2:
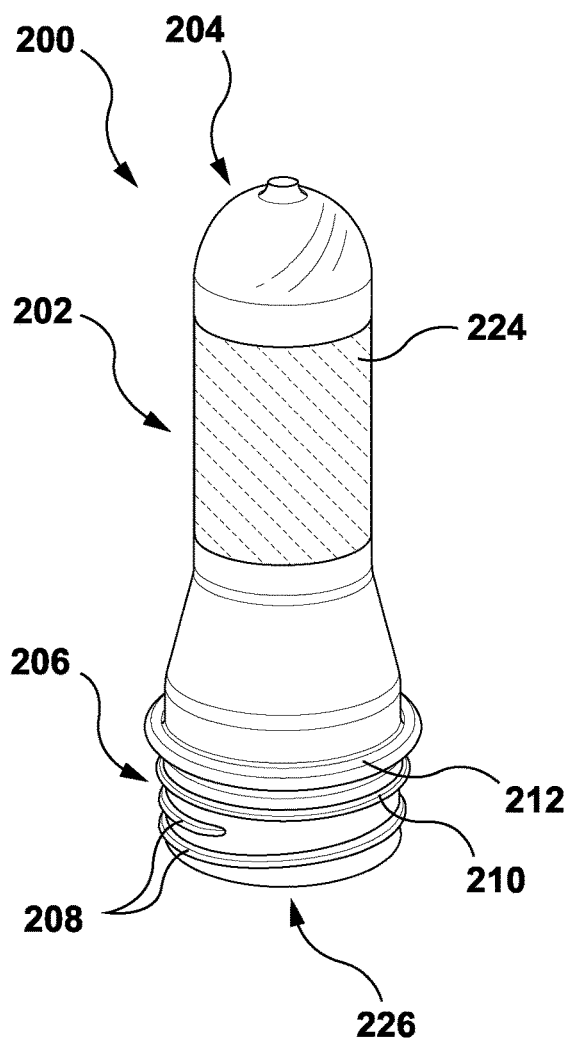
FIG. 2 is a perspective view of a multilayer article molded by the injection molding machine of FIG. 1.
Figure 3:
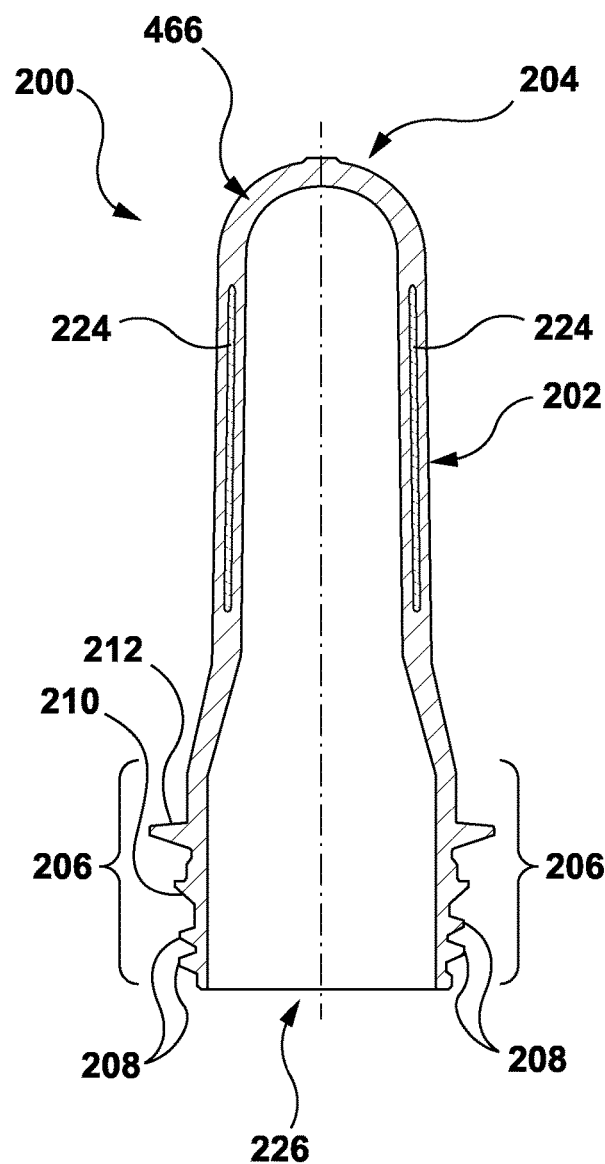
FIG. 3 is a longitudinal cross section of the multilayer article of FIG. 2.

An example of a molded article moldable in the injection molding machine 100 is a preform 200, shown in FIG. 2 in perspective view and in FIG. 3 in longitudinal cross section, of a type that is blow moldable into a container. As illustrated, the preform 200 has an elongate body 202, a hemispheric closed base 204, and a neck finish 206. The neck finish 206 of this example preform includes various external features including threads 208 for accepting and retaining a closure such as a threaded cap, an anti-pilfer bead 210, and a support ledge 212.

As best seen in FIG. 3, the preform 200 includes external and internal layers. The external layers, inner and outer, are molded from melt from the first injection unit 104. The internal layer 224 is molded from the (solidified) melt 466 from the second injection unit 106. The internal layer 224 is entirely encapsulated by the external layer material 466 in the depicted embodiment.

Figure 4:
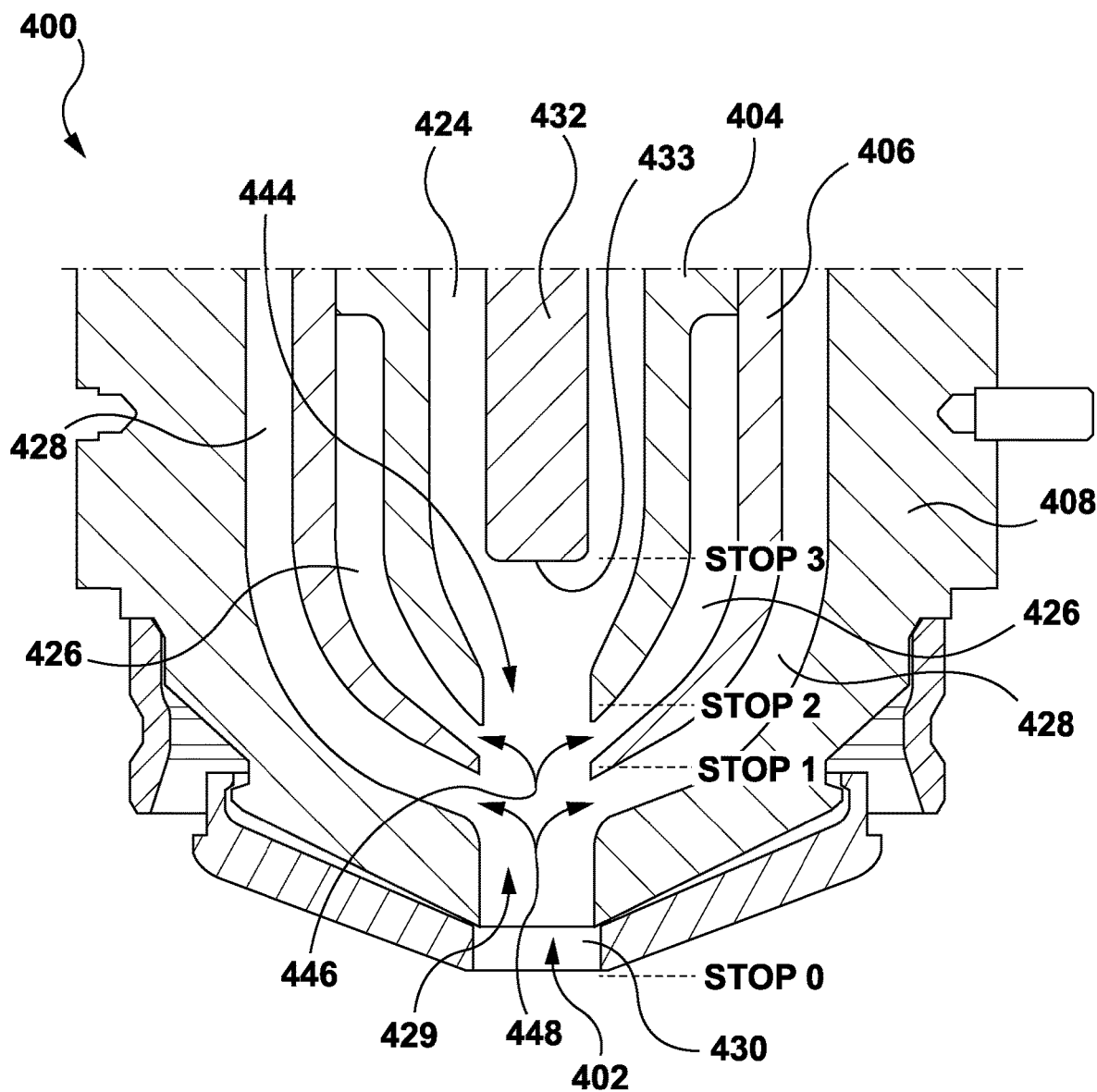
FIG. 4 is a longitudinal cross section of a portion of a hot runner coinjection nozzle used to inject molding material to form the multilayer article of FIGS. 2 and 3.

The preform 200 of FIGS. 2 and 3 is formed from external layer melt material 466 and internal layer melt material 466 injected into a mold cavity by an associated multi-channel coinjection nozzle 400 of the hot runner. FIG. 4 depicts a portion of the coinjection nozzle 400 in longitudinal cross section. The depicted portion of nozzle 400 is the downstream-most end of the nozzle, including the nozzle tip 402 from which melt is discharged into the mold cavity.

In the present exemplary embodiment, nozzle 400 is an assembly formed from three nested components: an innermost nozzle insert 404, an intermediary nozzle insert 406, and an outermost nozzle insert 408. In alternative embodiments, the nozzle may be formed in other ways, e.g. as a unitary component made using additive manufacturing techniques, such as direct metal laser sintering (DMLS). The example nozzle 400 has a substantially cylindrical shape, as does each of its component nozzle inserts 404, 406, and 408, but this is not a requirement.

Nozzle 400 of FIG. 4 defines three channels for conveying melt material.

A first, centrally disposed channel 424 defined by the innermost nozzle insert 404 provides a passage for conveying external layer melt material, received from the first injection unit 104, axially towards nozzle tip 402. Channel 424 also accommodates an axially reciprocable valve stem 432 that is used for controlling the flow of both types of melt material (i.e. external layer melt material and internal layer melt material) in the present embodiment, as will be described. Specifically, the channel 424 and valve stem 432 collectively define an annular passage through which external layer melt material is flowable until the melt clears the end of valve stem 432 (when the valve stem 432 is in the fully retracted position of FIG. 4) and exits outlet 444 as a substantially cylindrical flow. Upon exiting outlet 444, the melt enters nozzle combination area 429 for combination with one or more other melt streams, as will be described. Channel 424 may be referred to as inner channel 424, and outlet 444 may accordingly be referred to as the inner outlet 444.

A second, substantially annular channel 426 is defined between the innermost nozzle insert 404 and the intermediary nozzle insert 406. The second channel 426 conveys internal layer melt material received from the second injection unit 106 axially towards an inwardly facing annular outlet 446. Upon exiting the annular outlet 446, the annular melt stream flows into nozzle combination area 429 for combination with one or more other melt streams. Channel 426 may be referred to as the intermediate channel 426, and outlet 446 may accordingly be referred to as the intermediate outlet 446.

A third, substantially annular channel 428 is defined between the intermediary nozzle insert 406 and the outermost nozzle insert 408. The third channel 428 conveys external layer melt material received from the first injection unit 104 to inwardly facing annular outlet 448. Upon exiting outlet 448, the discharged melt enters nozzle combination area 429, where it may be combined with one or more other melt streams. Channel 428 may be referred to as the outer channel 428, and outlet 448 may accordingly be referred to as the outer outlet 448. In the present embodiment, the outer channel 428 is substantially concentric with each of the intermediate channel 426 and the inner channel 424.

It will be appreciated that, by virtue of the above-described nozzle structures, the inner, intermediate, and outer channels 424, 426, and 428 all supply or feed respective streams of molding material to the combination area 429, which may accordingly be referred to a "material combination area." By virtue of the material that they convey, the inner and outer channels 424, 428 may alternatively be referred to as external layer melt material channels. Similarly, the intermediate channel 426 may alternatively be referred to as an internal layer melt material channel.

Valve stem 432 is used to control the flow of molding material into the combination area 429 and thus the mold cavity associated with nozzle 400. The valve stem 432 is controlled by controller 108 by way of an actuator (not depicted) that reciprocates the valve stem 432 between at least a subset of four positions or stops.

The first valve stem position is the fully opened position depicted in FIG. 4, in which the distal end 433 of the valve stem is positioned at axial "Stop 3." In this position, the valve stem 432 does not impede the flow of molding material from any of the inner outlet 444, intermediate outlet 446, or outer outlet 448. This valve stem position is referred to herein as Position 3, with the number 3 representing the number of open (unblocked) nozzle outlets (i.e. outlets 444, 446, and 448).

The second position is a partially open position in which the end 433 of valve stem 432 is advanced (downwardly in FIG. 4) to the axial position marked as "Stop 2." When the valve stem 432 is in this position, it blocks (closes) inner outlet 444 and thereby prevents external layer melt material from flowing therefrom. Intermediate outlet 446 and outer outlet 448 remain open. This valve stem position is referred to herein as Position 2, with the number 2 representing the number of open nozzle outlets (i.e. outlets 446 and 448).

The third position is a mostly closed position in which the end 433 of valve stem 432 is advanced to the axial position marked as "Stop 1" in FIG. 4. When the valve stem 432 is in this position, it blocks both of inner outlet 444 and intermediate outlet 446 and thereby prevents external layer melt material and internal layer melt material, respectively, from flowing therefrom. Outer outlet 448 remains unblocked, permitting external layer melt material from injection unit 104 to flow into combination area 429. This valve stem position is referred to as Position 1, reflecting the single nozzle outlet (outlet 448) that is open in this position.

Finally, the fourth position is a fully closed position in which the end 433 of valve stem 432 is advanced to the axial position marked as "Stop 0" in FIG. 4 within gate area 430. When the valve stem 432 is in this position, it blocks each of the inner outlet 444, intermediate outlet 446, and outer outlet 448, thereby preventing melt material from flowing from any of those outlets. This valve stem position may be referred to as Position 0, with the number 0 reflecting the number of open nozzle outlets (i.e. none).

Of course, the above description of multi-layer nozzle 400 is merely exemplary, and other configurations of multi-layer nozzle are contemplated for use with the method of the present invention.

From the above description, it is evident that outlets 444, 446, and 448 permit fluid communication between inner external layer channel 424 and outer external layer channel 428 on the one hand, and intermediate interior layer channel 426 on the other. The inventor has discovered that such fluid communication results in transmission of pressure between first (external layer melt material) injection unit 104 and second (internal layer melt material) injection unit 106 when outlet nozzle valve 113 of first injection unit 106, and at least outlets 446 and 448 are in open or unblocked positions, respectively. The inventor has further discovered that a disadvantageous result of such pressure transmission is that the closing of the check valve in the second injection unit 106 could be greatly affected, causing large variations in shot weight. This, in turn, can result in short shots (i.e., underfilling of the mold) or flashing (i.e., overfilling of the mold) and subsequent loss or scrapping of molded articles.

To solve this problem, the inventor has devised a method wherein such pressure transmission does not occur or is at least substantially reduced.

Figure 5:
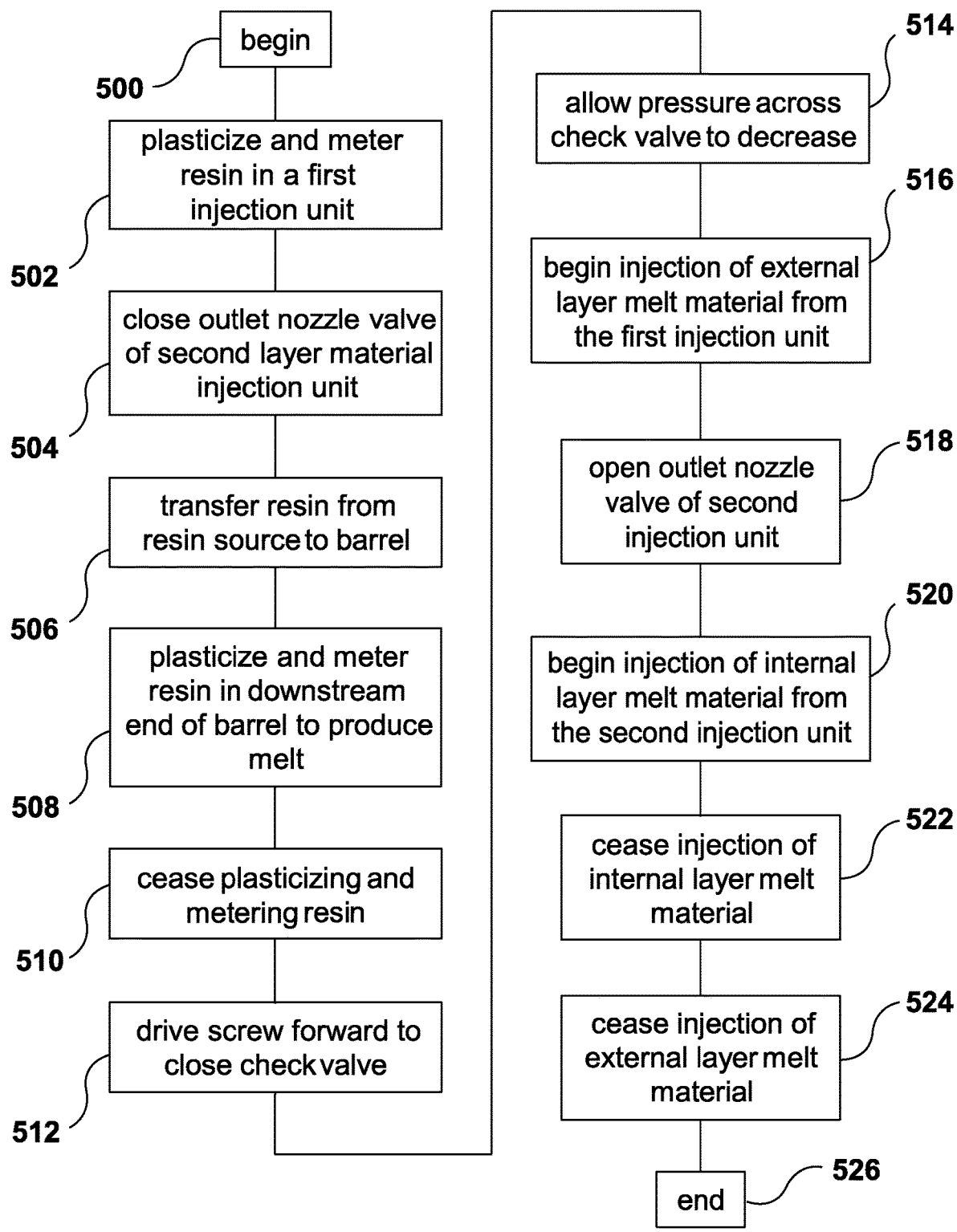
FIG. 5 is a flowchart of operation of the molding machine of FIG. 1 for forming the multi-layer article of FIG. 2 over the course of a molding cycle.
Figure 6A:
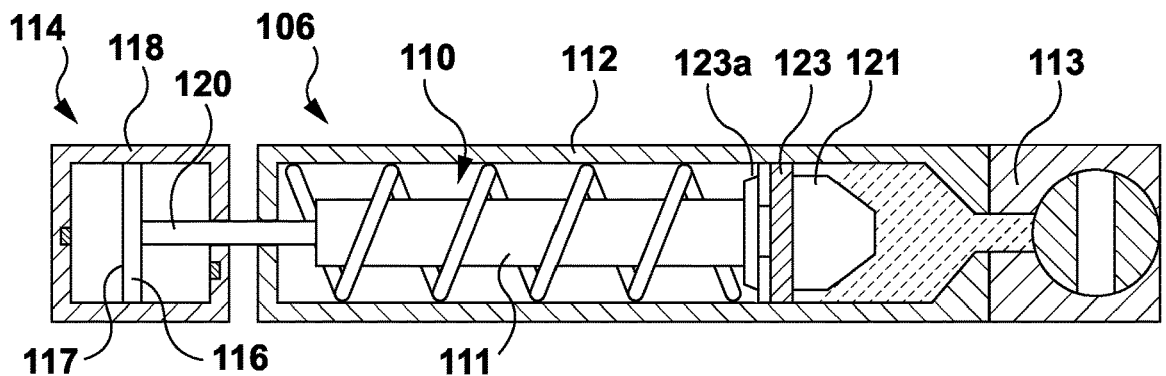
FIG. 6 shows four schematic views of a reciprocating screw within an internal layer injection unit component of the injection molding machine of FIG. 1 at four different points during an injection cycle.
Figure 6B:
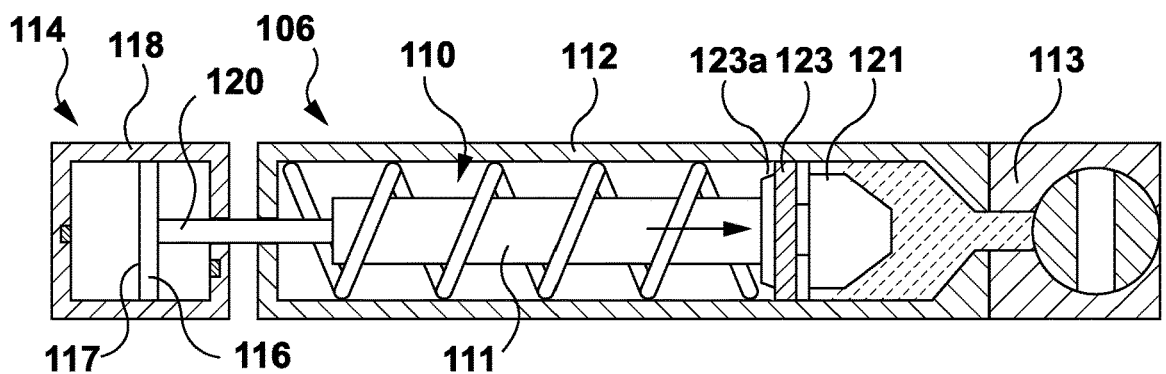
Figure 6C:
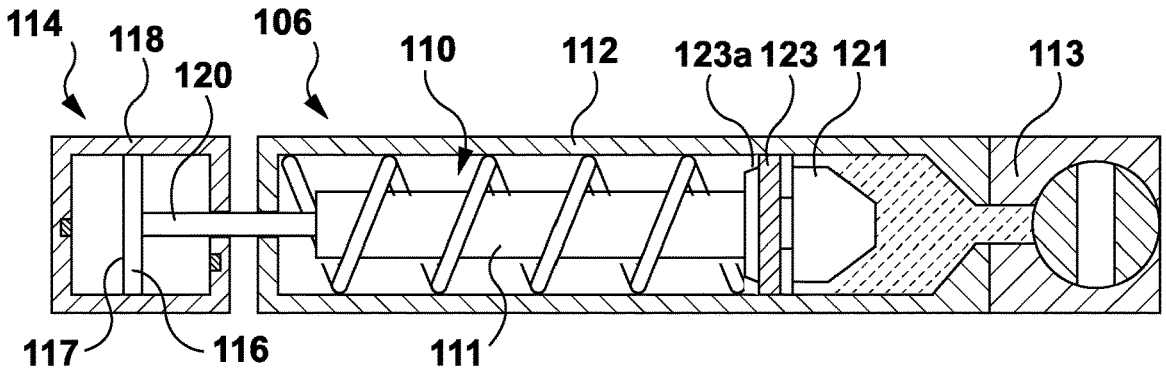
Figure 6D:
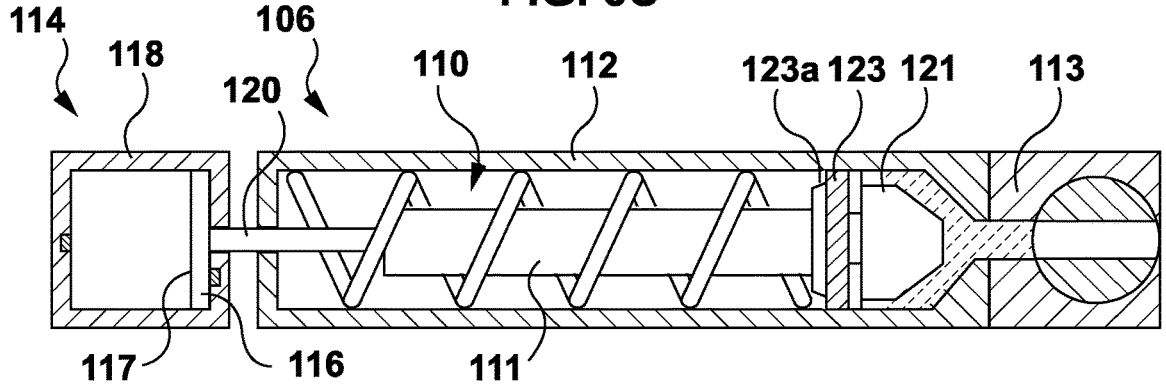

Referring to FIG. 5, there is disclosed a method of improving shot repeatability in a reciprocating screw injection molding apparatus, such as the exemplary reciprocating screw injection molding apparatus disclosed above. In FIG. 5, step 500 is the start of an injection cycle. In step 502, the first injection unit 104 is operated to plasticize and meter resin. That is, a shot of a first resin is plasticized and metered in the extruder then transferred to the shooting pot for injection. In step 504, outlet nozzle valve 113 of second material injection unit 106 (FIG. 1A) is closed to preclude fluid communication between the first injection unit 104 and the second injection unit 106. Next, resin is transferred from a resin source to the barrel of second injection unit 106 (step 506), where it is plasticized and metered in the downstream end by rotational actuation of reciprocating screw 110 (FIG. 1A) to create a melt 466 therein (step 508). As melt 466 accumulates in the downstream end of barrel 112 (FIG. 1A), plastic pressure Pp urges screw 110 upstream within the barrel, as is known in the art. In step 510, rotational actuation of the screw 110 is ceased and the screw 110 is allowed to retreat a distance upstream to reduce plastic pressure Pp against check ring 123 (which is still in the open position). The position of screw 110 and check valve 123 at the completion of step 510 is shown schematically in FIG. 6A. In step 512, the screw 110 is driven forward (i.e., in the downstream direction) by actuator 114 to increase plastic pressure Pp sufficiently to close check ring 123. The position of screw 110 and check ring 123 at the completion of step 512 is shown schematically in FIG. 6B relative to the screw position shown in FIG. 6A. As can be seen in FIG. 6B, check ring 123 is now in the closed position with the upstream side of check ring 123 abutting check ring seat 123a. In step 514, actuator 114 ceases to drive screw 111 forward and the screw 110 is allowed to retreat in the upstream direction so that plastic pressure Pp against (now closed) check ring 123 is diminished. The position of screw 110 and check ring 123 after completion of step 514 is shown schematically in FIG. 6C relative to the screw positions shown in FIGS. 6A and 6B. Next, the first injection unit 104 is operated to begin injecting the plasticized melt of first molding material into the mold (step 516). In step 518, the outlet nozzle valve 113 of the second injection unit 106 is opened. Then, in step 520, the second injection unit 106 is actuated to inject internal layer melt material into the melt stream. Those of skill in the art would understand that the time elapsed between steps 516 and 520 may vary depending on the particular application involved. For example, factors that may vary the timing between steps 516 and 520 include the type of article being molded, the type of materials comprising external and internal melt materials, etc. Next, coinjection of internal layer melt material is ceased (step 522), and then injection of external layer melt material is ceased (step 524). Of course, for the reasons described above, those of skill in the art would understand that the time elapsed between steps 522 and 524 may also vary depending on the particular application involved. Following step 524, one injection cycle is completed (step 526). The position of screw 110 and check valve 123 after completion of step 524 is shown in FIG. 6D, relative to the positions shown in FIGS. 6A through 6C.

A further aspect of the present disclosure will now be explained. As explained above with respect to FIG. 1B, during injection, reciprocating screw injection molding machines, such as the exemplary reciprocating screw injection molding machine disclosed above, may follow a two-stage sequence to fill the mold, comprising a velocity profile VP followed by a pressure profile PP. As also explained above with respect to FIG. 1B, the location of the screw within the barrel when the controller switches from the velocity profile to the pressure profile may be called the transition position T. Because the transition position T occurs when the mold is nearly filled, there is a close relationship between the transition position T and the shot volume. The inventor has recognized that, upon completion of step 514 of FIG. 5, shot volume may be calculated based on the position of the screw following closure of the check valve 123 and pressure equilibration. This allows for the transition position T to be calculated (and potentially adjusted from cycle to cycle, if need be) because at the transition position T the calculated volume of melt will be substantially within the mold (or finally entering the mold under pressure).

Figure 5A:
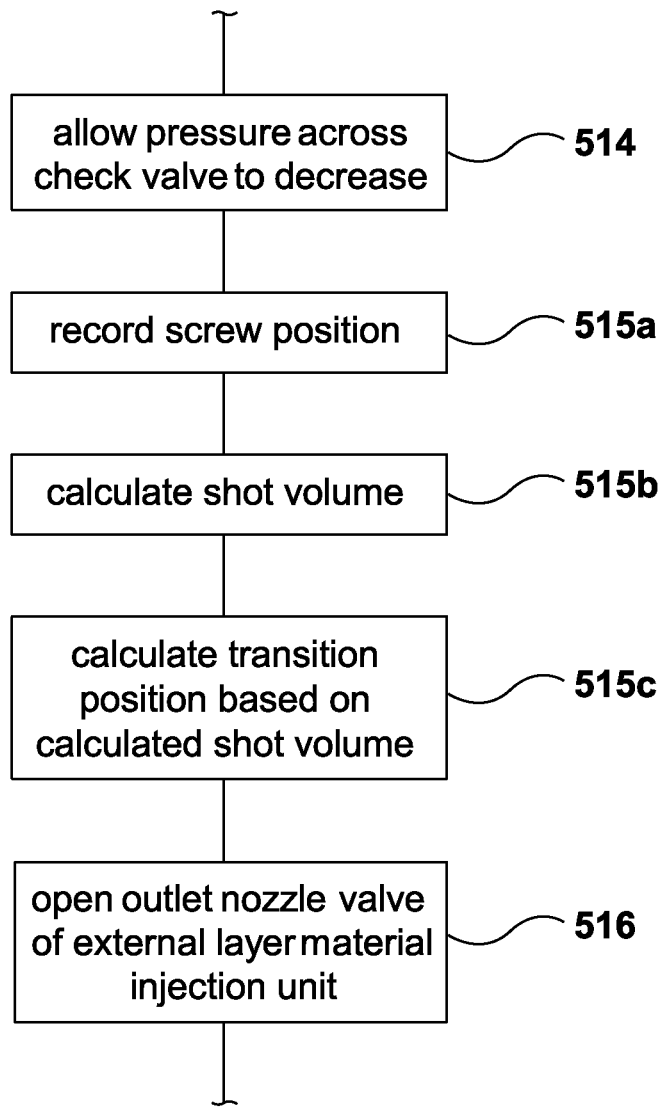
FIG. 5A is a portion of a flowchart depicting a modification of the flowchart of FIG. 5 including optional additional steps.

This further aspect of the present disclosure will now be described with respect to FIG. 5A. FIG. 5A depicts a modification of the method of FIG. 5 including optional steps 515a through 515c inserted between steps 514 and 516 of FIG. 5. Specifically, following step 514 (FIG. 5), the position of the screw 110 (FIG. 1A) is recorded at step 515a. Because the volume of the extruder barrel 112 is known, the volume of the melt within it may be calculated. For example, in the (idealized) case of a perfectly cylindrical extruder barrel 112 and screw tip 121, the relationship $V=\pi r^2 h$ may be used to determine the volume (V) of melt following step 514, where r is the radius of the cylinder, and h is the distance between the screw tip 121 and the downstream end of the extruder. Thus, at step 515b the volume of melt within the extruder barrel 112 is calculated. From this, it is possible to determine the transition position because the same volume must substantially occupy the mold upon completion of the velocity profile. This calculation is made at step 515c. From this point, the method proceeds as explained with respect to FIG. 5.

Of course, this further aspect of the present disclosure is not limited to methods for reciprocating screw coinjection. That is, the method for improving shot repeatability described with respect to FIG. 5A, wherein a transition position may be calculated, may be implemented in a reciprocating screw injection machine comprising a single material injection unit.

The above-described molding machine 100 is for molding multilayer articles that are preforms. In alternative embodiments, the molding machine may be intended for molding other types of multilayer articles, e.g. other types of containers or closures such as lids.

The foregoing description of embodiments of the invention are to be considered as illustrative and not as limiting. For example, many types of multilayer coinjection nozzles other than multi-layer coinjection nozzle 104 may be used in reciprocating screw coinjection machines according to the invention. Likewise, types of check valves other than described check ring 123 may be used in reciprocating screw coinjection machines according to the invention. Various other changes and modifications will also occur to those skilled in the art after referral to the above description without departing from the spirit and scope of the present invention. Other modifications may be made within the scope of the following claims.

What is claimed is:

1. A method of improving shot repeatability in a reciprocating screw injection molding machine, the reciprocating screw injection molding machine comprising a mold gate, a mold cavity, a first injection unit, and a second injection unit including a longitudinal barrel having a downstream end proximate to an outlet nozzle valve and an upstream end proximate to a resin source, and a screw positioned coaxially within the longitudinal barrel including a check ring, the method comprising the steps of:
    plasticizing and metering a first injection unit resin in the first injection unit to form a first melt;
    closing the outlet nozzle valve of the second injection unit;
    transferring a resin from the resin source to the screw within the longitudinal barrel of the second injection unit;
    plasticizing the resin and metering the plasticized resin in the downstream end of the longitudinal barrel of the second injection unit via rotational actuation of the screw to produce a second melt;
    ceasing application of rotational actuation of the screw;
    applying an axial force upon the screw in the downstream direction to increase a pressure gradient across the check ring sufficient to close the check ring;
    ceasing application of the axial force upon the screw in the downstream direction after the check ring is closed;
    beginning injection of the first melt from the first injection unit;
    thereafter opening the outlet nozzle valve of the second injection unit; and
    applying the axial force upon the screw in the downstream direction to begin injection of the second melt from the second injection unit through the mold gate and into the mold cavity to begin coinjection of the second melt from the second injection unit into the mold cavity via the mold gate.

2. The method of claim 1, the first injection unit further comprising a second longitudinal barrel having a downstream end proximate to a second outlet nozzle valve and an upstream end proximate to a second resin source, and a second screw positioned coaxially within the second longitudinal barrel comprising a second check ring.

3. The method of claim 1 comprising, after the step of ceasing application of the axial force upon the screw in the downstream direction, the further steps of:
    recording a first position of the screw;
    calculating a transition position (T) of the screw based at least on the first position of the screw;
    applying the axial force upon the screw in the downstream direction to inject the first second melt through the mold gate and into the mold cavity according to a velocity profile (VP); and
    applying the axial force upon the screw according to a pressure profile (PP) when the screw reaches the transition position (T).

4. The method of claim 1 comprising, after the step of beginning coinjection of the second melt from the second injection unit into the mold cavity via the mold gate, the further step of:
    ceasing coinjection of the second melt from the second injection unit into the mold cavity via the mold gate.

5. The method of claim 4 comprising, after the step of ceasing coinjection of the second melt from the second injection unit into the mold cavity via the mold gate, the further step of:
    ceasing injection of the first melt through the mold gate and into the mold cavity.

6. A method of improving shot repeatability in a reciprocating screw injection molding machine, the reciprocating screw injection molding machine comprising a mold gate, a mold cavity, a first injection unit, and a second injection unit including a longitudinal barrel having a downstream end proximate to an outlet nozzle valve and an upstream end proximate to a resin source, and a screw positioned coaxially within the longitudinal barrel comprising a check ring, the method comprising the steps of:

plasticizing and metering a first injection unit resin in the first injection unit to form a first melt;

closing the outlet nozzle valve of the second injection unit;

transferring a resin from the resin source to the screw within the longitudinal barrel of the second injection unit;

plasticizing the resin and metering the plasticized resin in the downstream end of the longitudinal barrel of the second injection unit via rotational actuation of the screw to produce a second melt;

ceasing application of rotational actuation of the screw;

applying an axial force upon the screw in the downstream direction to increase a pressure gradient across the check ring sufficient to close the check ring;

ceasing application of the axial force upon the screw in the downstream direction after the check ring is closed;

recording a first position of the screw;

calculating a transition position (T) of the screw based at least on the first position of the screw;

beginning injection of the first melt from the first injection unit;

thereafter opening the outlet nozzle valve of the second injection unit;

applying the axial force upon the screw in the downstream direction to inject the second melt from the second injection unit through the mold gate and into the mold cavity according to a velocity profile (VP); and applying the axial force upon the screw according to a pressure profile (PP) when the screw reaches the transition position (T).

7. The method of claim 6, the first injection unit further comprising a second longitudinal barrel having a downstream end proximate to a second outlet nozzle valve and an upstream end proximate to a second resin source, and a second screw positioned coaxially within the second longitudinal barrel comprising a second check valve.

8. The method of claim 6 comprising, after the step of beginning injection of a second melt from the second injection unit into the mold cavity via the mold gate and prior to the step of applying an axial force upon the screw according to a pressure profile (PP) when the screw reaches the transition position (T), the further step of:

ceasing injection of the second melt from the second injection unit into the mold cavity via the mold gate.

9. The method of claim 8 comprising, after the step of ceasing coinjection of the second melt from the second injection unit into the mold cavity via the mold gate, the further step of:

ceasing injection of the first melt through the mold gate and into the mold cavity.

\* \* \* \* \*

UNITED STATES PATENT AND TRADEMARK OFFICE
CERTIFICATE OF CORRECTION

PATENT NO. : 12,304,126 B2
APPLICATION NO. : 18/004914
DATED : May 20, 2025
INVENTOR(S) : Douglas James Weatherall Page 1 of 1

It is certified that error appears in the above-identified patent and that said Letters Patent is hereby corrected as shown below:

In the Specification

At Column 1, Line 12: "Provisional Application No. 63/058,037" should read --Provisional Application No. 63/058,073--

In the Claims

At Column 12, Line 47: "to inject the first second melt" should read --to inject the second melt--

Signed and Sealed this
Twenty-second Day of July, 2025

Coke Morgan Stewart
*Acting Director of the United States Patent and Trademark Office*